No. 657,558. Patented Sept. 11, 1900.
S. D. MELVIN.
ASH SIFTER.
(Application filed Jan. 2, 1900.)

(No Model.)

Witnesses
C. H. Walker.
J. F. Riley

Samuel D. Melvin, Inventor
By his Attorneys,
C. A. Snow & Co.

UNITED STATES PATENT OFFICE.

SAMUEL DOUGLAS MELVIN, OF FREYTOWN, PENNSYLVANIA.

ASH-SIFTER.

SPECIFICATION forming part of Letters Patent No. 657,558, dated September 11, 1900.

Application filed January 2, 1900. Serial No. 110. (No model.)

*To all whom it may concern:*

Be it known that I, SAMUEL DOUGLAS MELVIN, a citizen of the United States, residing at Freytown, in the county of Lackawanna and State of Pennsylvania, have invented a new and useful Ash-Sifter, of which the following is a specification.

The invention relates to improvements in ash-sifters.

One object of the present invention is to improve the construction of ash-sifters and to provide a simple, inexpensive, and durable one, the body portion of which will be adapted to form the ash-pan of the stove, so as to receive the ashes as they fall from the fire.

A further object of the invention is to enable the ashes of a stove to be readily sifted and the cinders thereof quickly separated from the dust and the pan or body portion returned to the stove in a short time.

The invention consists in the construction and novel combination and arrangement of parts, hereinafter fully described, illustrated in the accompanying drawings, and pointed out in the claim hereto appended.

Figure 1:
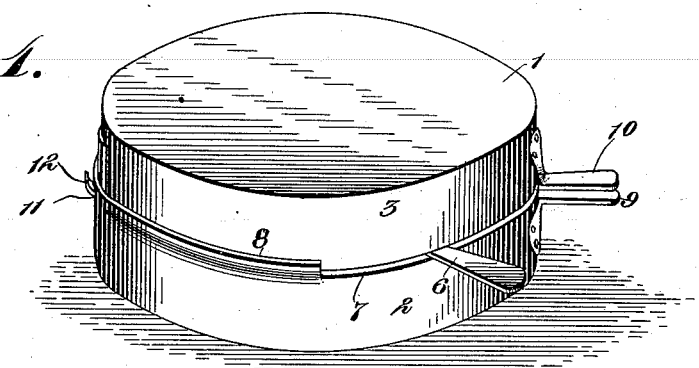
Figure 2:
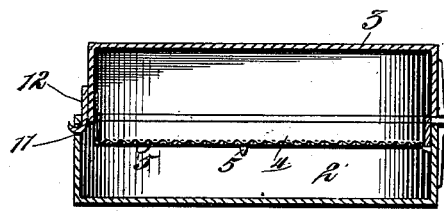
Figure 3:
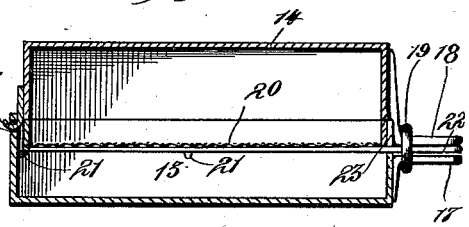
Figure 4:
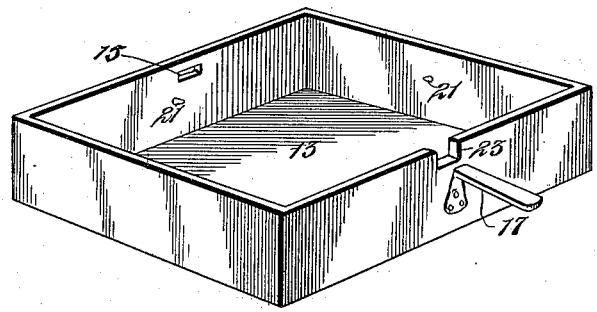

In the drawings, Figure 1 is a perspective view of an ash-sifter constructed in accordance with this invention. Fig. 2 is a vertical sectional view of the same. Fig. 3 is a similar view of a modification of the invention. Fig. 4 is a perspective view of the body portion of the modified form of ash-sifter.

Like numerals of reference designate corresponding parts in all the figures of the drawings.

1 designates an ash-sifter comprising a lower body portion or pan 2, an upper section or cover 3, and a sieve or screen removably arranged within the body portion or pan 2, as clearly shown in Fig. 2 of the accompanying drawings. The ash-sifter is cylindrical, as shown, and the lower body portion or pan 2 is designed to form the ash-pan of a stove and to be arranged in the ash-pit thereof to receive the ashes as they fall from the grate, and by this arrangement it is unnecessary to shove the ashes from the stove, and the dust incident to such operation is avoided.

The sifter 4, which consists of a horizontal screen and a marginal flange, is supported by lugs 5 when the parts are in an upright position and is provided with a handle 6, which extends outward through a recess or cut-away portion 7 of the upper edge of the pan or body portion 2. The lugs project from the inner faces of the walls of the pan or body portion, and the sieve 4 is adapted to be oscillated to sift the ashes.

The pan or body portion 2 is provided at its upper edge with a flange 8, which is offset from the plane of the walls of the same and which provides a supporting shoulder or ledge to receive the lower edges of the walls of the top section or cover 3.

Handles 9 and 10 are provided at the front of the ash-sifter and are secured, respectively, to the pan 2 and the cover 3, and the said pan is provided at its back with a slot 11, arranged as shown in Fig. 2 of the accompanying drawings and receiving a hook or projection 12, extending from the back of the cover 3. By this construction the cover and the pan are detachably interlocked and there is no liability of their becoming accidentally separated when the handles 9 and 10, which are arranged contiguous to each other, are grasped by the operator.

The sifter can be conveniently held in one hand while the handle 6 of the sieve is being oscillated by the other hand, and the said sieve is readily removable from the casing formed by the pan and the cover. The ashes are received within the pan or body 2 as they fall from the grate of a latrobe or other heating-stove, and after the pan or body is removed therefrom the sieve or screen and the top section or cover are placed in position. The sifter is then reversed to bring the ashes upon the sieve or screen, which is operated to sift the same. After the operation of sifting has been completed the pan or body portion, which is uppermost, and the sieve or screen are removed from the inverted top section or cover to separate the cinders from the dust. After the parts have been separated the bottom portion or pan is reversed to arrange it in its initial position, and it then contains the cinders, which may be returned to the stove or latrobe, so that the fuel may be entirely consumed. The pan or body portion may then be replaced in the ash-pit of the stove, and the top section or cover 3 forms a receptacle for the dust, which may be readily removed and emptied into a convenient receptacle.

Instead of constructing the casing circular it may be rectangular, as illustrated in Figs. 3 and 4 of the accompanying drawings. The rectangular pan and cover 13 and 14 are connected at the back by a hook or projection 16 and a slot 15, arranged similar to the parts 11 and 12, heretofore described, and the handle 17 and 18, which are arranged at the front of the rectangular casing, may be connected by a link 19 to prevent any liability of the casing opening while it is being shaken to sift its contents. The sieve 20, which is supported by lugs 21 of the pan 13, is provided at the bottom with an outwardly-extending handle 22, arranged in a slot 23 of the pan. The slot 23 is covered by the flange or wall of the sieve, as clearly illustrated in Fig. 3 of the accompanying drawings, so that there is no liability of dust escaping during the operation of sifting. The recessed or cut-away portion of the pan 2 is covered by the upper portion of the flange or wall of the sieve 4, as clearly shown in Fig. 2 of the drawings, to prevent the escape of dust.

It will readily be seen that the ash-sifter is simple and comparatively inexpensive in construction, that the body portion or pan is adapted to be arranged in the ash-pit of a stove to receive the ashes as they fall from the grate, and that the device will enable the ashes to be readily sifted and the cinders separated from the dust and the pan or body returned to the ash-pit of the stove. It will also be apparent that the handles of the upper and lower sections of the casing are arranged adjacent to each other, so that they may be simultaneously grasped by the operator with one hand, and the handle of the screen or sieve may be arranged between the said handles, so that all three may be simultaneously grasped by the operator when carrying the ash-sifter from one place to another, so that there will be no liability of the sieve or screen accidentally oscillating and permitting dust to escape.

Changes in the form, proportion, size, and the minor details of construction within the scope of the appended claim may be resorted to without departing from the spirit or sacrificing any of the advantages of this invention.

What is claimed is—

An ash-sifter comprising a pan, a cover detachably interlocked with the pan, handles projecting from the pan and the cover and arranged adjacent to each other, and a sieve or screen arranged within the pan and provided with a projecting handle adapted to be arranged between the said handles, substantially as described.

In testimony that I claim the foregoing as my own I have hereto affixed my signature in the presence of two witnesses.

SAMUEL DOUGLAS MELVIN.

Witnesses:
A. D. DEAN,
F. E. LOOMIS.